United States Patent
Kittel

(10) Patent No.: US 10,875,251 B2
(45) Date of Patent: Dec. 29, 2020

(54) METHOD FOR CONNECTING COMPONENTS, ONE OF WHICH IS MADE OF A FIBER-REINFORCED PLASTIC

(71) Applicant: EJOT GmbH & Co. KG, Bad Berleburg (DE)

(72) Inventor: Dieter Kittel, Bad Laasphe (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 212 days.

(21) Appl. No.: 15/124,104

(22) PCT Filed: Mar. 5, 2015

(86) PCT No.: PCT/EP2015/054596
§ 371 (c)(1),
(2) Date: Sep. 7, 2016

(87) PCT Pub. No.: WO2015/135824
PCT Pub. Date: Sep. 17, 2015

(65) Prior Publication Data
US 2017/0015049 A1 Jan. 19, 2017

(30) Foreign Application Priority Data
Mar. 11, 2014 (DE) .................. 10 2014 204 449

(51) Int. Cl.
*B29C 65/06* (2006.01)
*B29C 65/56* (2006.01)
(Continued)

(52) U.S. Cl.
CPC ........ *B29C 65/0609* (2013.01); *B29C 65/069* (2013.01); *B29C 65/0627* (2013.01); *B29C 65/0672* (2013.01); *B29C 65/562* (2013.01); *B29C 65/64* (2013.01); *B29C 66/1122* (2013.01); *B29C 66/21* (2013.01); *B29C 66/3494* (2013.01); *B29C 66/41* (2013.01); *B29C 66/474* (2013.01); *B29C 66/721* (2013.01); *B29C 66/7212* (2013.01);
(Continued)

(58) Field of Classification Search
CPC ... B29C 65/0609; B29C 65/0627; F16B 5/08; F16B 5/04
See application file for complete search history.

(56) References Cited

U.S. PATENT DOCUMENTS

| | | | |
|---|---|---|---|
| 5,354,160 | A | 10/1994 | Pratt et al. |
| 6,913,666 | B1 | 7/2005 | Aeschlimann et al. |
| 9,346,223 | B2 | 5/2016 | Payne |
| 2010/0186900 | A1 | 7/2010 | Christ |

(Continued)

FOREIGN PATENT DOCUMENTS

| | | |
|---|---|---|
| DE | 10 2007 030 806 A1 | 1/2009 |
| DE | 10 2009 013 265 A1 | 9/2010 |

(Continued)

OTHER PUBLICATIONS

Office action for Japanese Application No. 2016-556274 dated Oct. 16, 2018.
Office action for Russian Application No. 2016138337/05(060839) dated Sep. 5, 2018.
Russian Search Report for Application No. 2016138337/05(060839) dated 4, 2018.
(Continued)

*Primary Examiner* — Christopher T Schatz
(74) *Attorney, Agent, or Firm* — Pearne & Gordon LLP

(57) ABSTRACT

A method and a connecting element for joining two components, at least one of which is made of a fiber-reinforced composite, are proposed.

9 Claims, 8 Drawing Sheets

Figure 1:
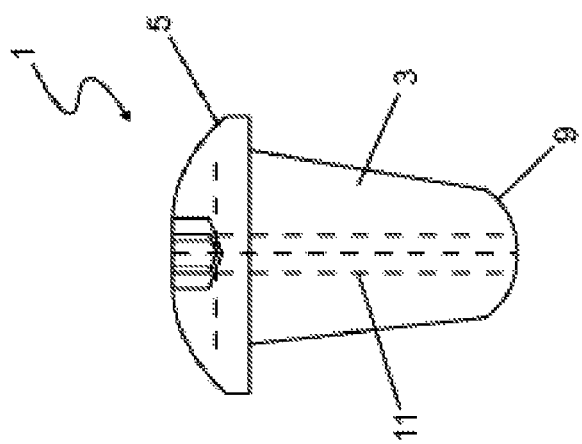

(51) Int. Cl.
    *B29C 65/64* (2006.01)
    *B29C 65/00* (2006.01)
    *F16B 5/04* (2006.01)
    *F16B 5/08* (2006.01)
    B29L 31/30 (2006.01)
    B29L 31/00 (2006.01)
    B29C 65/74 (2006.01)
    B29K 309/08 (2006.01)
    B29K 623/00 (2006.01)
    B29K 677/00 (2006.01)

(52) U.S. Cl.
    CPC ........ *B29C 66/742* (2013.01); *B29C 66/8322* (2013.01); *B29C 66/92443* (2013.01); *B29C 66/93451* (2013.01); *F16B 5/04* (2013.01); *F16B 5/08* (2013.01); B29C 65/7437 (2013.01); B29C 66/71 (2013.01); B29C 66/7392 (2013.01); B29C 66/7394 (2013.01); B29C 66/93441 (2013.01); B29C 2793/0045 (2013.01); B29K 2309/08 (2013.01); B29K 2623/12 (2013.01); B29K 2677/00 (2013.01); B29L 2031/30 (2013.01); B29L 2031/3076 (2013.01); B29L 2031/737 (2013.01)

(56) References Cited

U.S. PATENT DOCUMENTS

2014/0044476 A1* 2/2014 Cove ..................... B29C 65/08
    403/270
2016/0341234 A1* 11/2016 Germann ............... B21J 15/147

FOREIGN PATENT DOCUMENTS

| | | |
|---|---|---|
| DE | 10 2011 001 522 A1 | 9/2012 |
| EP | 1614525 A1 | 1/2006 |
| EP | 2762731 A1 | 8/2014 |
| JP | S62124306 A | 6/1987 |
| JP | H04244609 A | 9/1992 |
| JP | H05504311 A | 7/1993 |
| JP | 2013148122 A | 8/2013 |
| RU | 2441755 C2 | 2/2012 |
| WO | 9111309 A2 | 8/1991 |
| WO | 9302850 A2 | 2/1993 |
| WO | 9842988 A1 | 10/1998 |

OTHER PUBLICATIONS

International Search Report for PCT/EP2015/054596 dated May 15, 2015.
Search Report for DE 10 2014 204 449.9 dated May 24, 2014.

* cited by examiner

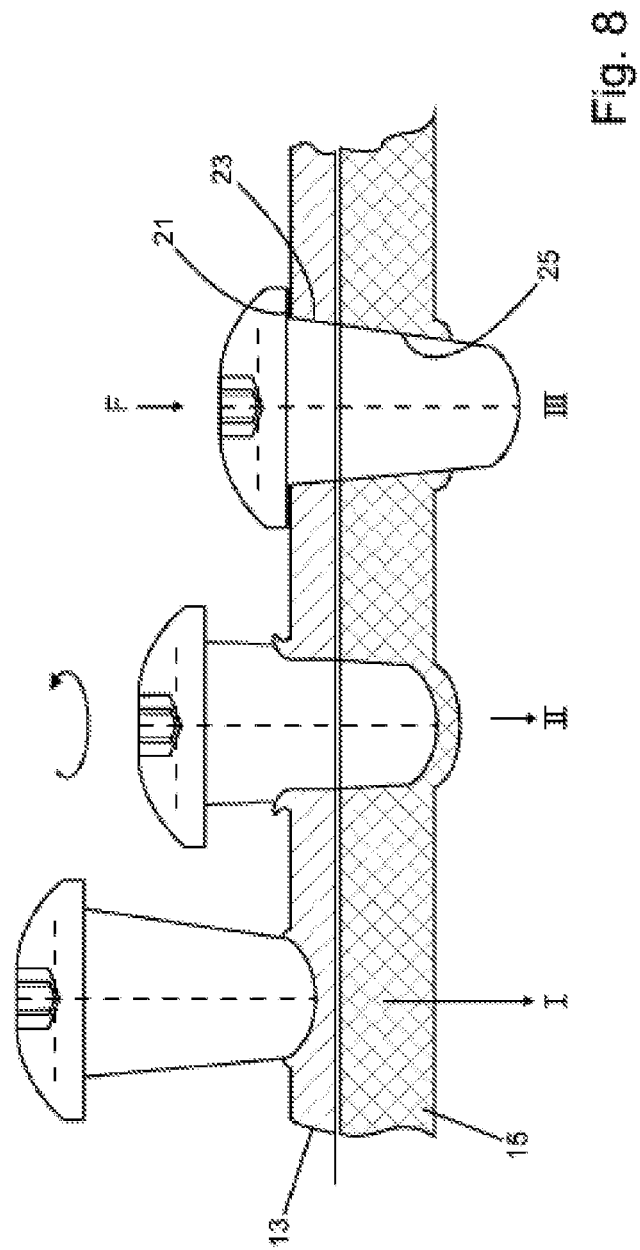

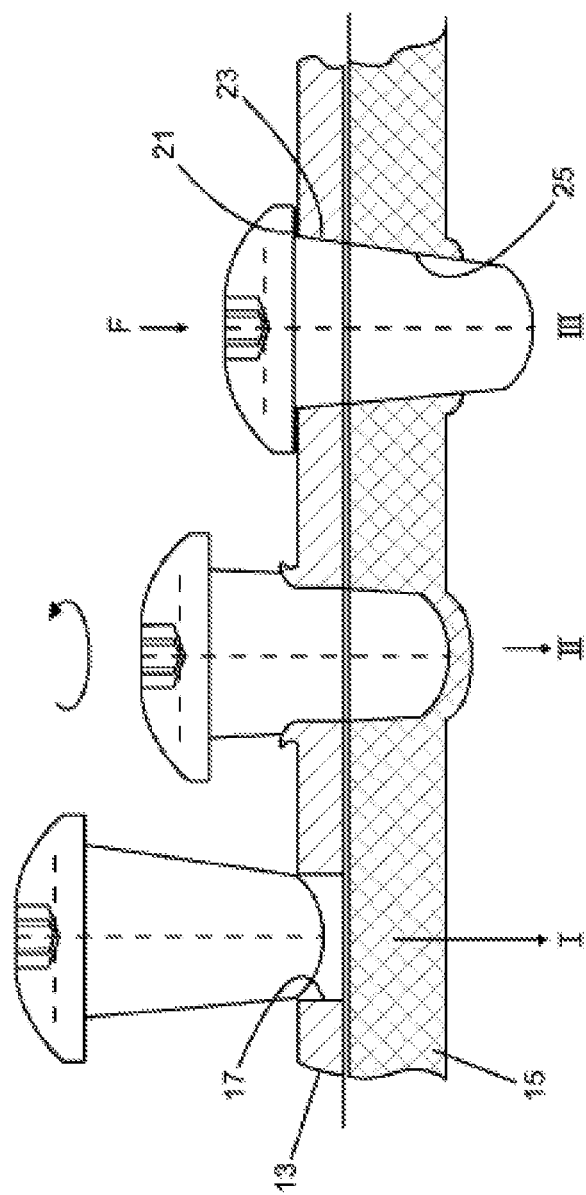

METHOD FOR CONNECTING COMPONENTS, ONE OF WHICH IS MADE OF A FIBER-REINFORCED PLASTIC

CROSS-REFERENCE TO RELATED APPLICATION

This is a National Stage application of PCT international application PCT/EP2015/054596, filed on Mar. 5, 2015, which claims the priority of German Patent Application No. 10 2014 204 449.9, filed Mar. 11, 2014, both of which are incorporated herein by reference in their entirety.

The invention relates to a method for connecting two components, at least one of which is made of a fiber-reinforced plastic. Fiber-reinforced plastics, due to their favorable ratio of strength to weight, are an important factor in successfully implementing structures which are very lightweight and which still have a very high load capacity.

For this reason, for many years they have seen increasing use in aircraft construction, automotive manufacture, and in other areas of lightweight construction.

In conjunction with the claimed invention, the term "fiber-reinforced plastic" is defined very broadly. In any case, it encompasses a matrix which may be composed of a thermosetting plastic or a thermoplastic plastic. Fibers, which may be individual fibers, fiber fabrics, or fiber structures, are embedded in this matrix. Carbon (CRP), glass, or aramid are frequently used fiber materials.

Depending on the stresses which occur during operation of the component, the fibers are arranged and oriented within the matrix in such a way that high-performance components result which have very low weight.

One important advantage of a thermoplastic matrix of fiber-reinforced plastics may be considered to be that these materials can be shaped by heat forming. Plate-shaped fiber-reinforced plastics having a thermoplastic matrix are also referred to as "organic sheet," and within the meaning of the claimed invention also fall under the term "fiber-reinforced plastic."

The joining of two or more identical or different components is an important task for practically all products.

When two components made of a fiber composite containing carbon fibers (referred to below as CRP) are connected to one another in the conventional manner, for example using screws or rivets, due to the position of graphite in the electrochemical series, contact corrosion occurs, which is not acceptable, since the connection then has only a short service life. In terms of corrosion, the graphite contained in the carbon fibers behaves as a relatively noble metallic material, so that components made of CRP cannot be joined or connected to connecting elements (rivets or screws) made of base metals such as steel or aluminum. When connecting elements made of base metals are used for this purpose, corrosion occurs after a short period of time.

In aircraft construction, this situation has been addressed by connecting CRP components using screws or rivets made of titanium alloys, the titanium alloys having only a slight potential difference with respect to graphite. However, in many areas such as the automotive industry, this approach is not suitable for cost reasons, among others.

From U.S. Pat. No. 5,354,160 and WO 93/02850 methods for joining of two components are known, which use a dome made of fibre-reinforced plastic. This dome comprises a tieback anchor, by means of which the head of the dome and the components to be joined can be distorted in an axial direction of the dome. In this state, a cylindrical part of the dome protruding through the bores in the components to be joined is warmed by a rotating tool so as to be plastically formable. As soon as enough plasticity is reached, the rotation of the tool stops and the tool is moved in axial direction towards the components to be joined. Thereby, a flange is formed on the dome. Subsequently, the tieback anchor or the dome is cut off.

The object of the invention is to provide a method for joining or connecting at least two components, which is cost-effective and operationally reliable and which also eliminates the risk of contact corrosion, wherein at least one component is made of a fiber-reinforced plastic.

This object is achieved according to the invention by a method as claimed, a plastic dome for connecting at least two components as claimed, and an assembly unit comprising at least two components as claimed.

The method according to the invention for joining at least two components, wherein at least one component is made of a fiber-reinforced plastic, includes joining the at least two components by means of a form-fit connection using a rotationally symmetrical dome made of a filled plastic, preferably glass fiber-reinforced polyamide or polypropylene, which is set in rotation or oscillation and inserted into the components by applying an axial force.

By use of the joining method according to the invention, it is possible to heat and partially melt the dome by friction against the components to be joined. At the same time, a core of the dome remains solid enough that the dome itself, in a setting operation, produces the installation space that it requires by application of a sufficient axial force. After the dome has reached its end position in the components to be connected, the melted-on material fill of the dome welds to at least one of the components to be connected, so that a nonmetallic connection capable of bearing load is established between the components after the joining sites cool.

It is possible to set the dome in uniform rotation, or in brief rotary motions with alternating directions of rotation. These alternatives are referred to as rotation and oscillation, respectively. The joining method according to the invention is not limited to these explicitly named relative motions between the dome and the components to be joined. Rather, other relative motions, such as small circular motions of the dome, or combinations of such motions, may be used.

The joining according to the invention shares common features with conventional friction welding. A significant difference is that the dome delivers the weld filler material, and the unmelted portion of the dome is a connecting element.

The method according to the invention is easy to manage technically, since the control of rotation or oscillation, the pressing force, and the axial motions of the dome may take place in a reproducible manner with NC controls. Due to their common features with friction welding as an established joining method, devices and controls for friction welding may be optimized, with certain modifications, for the method according to the invention.

It is self-evident that, due to the greatly different material properties of the components to be connected and of the plastic dome, the process parameters such as rotation speed of the dome, feed force during the rotation or oscillation of the dome, the pressing force after the rotary motion of the dome has ended, and the duration of the method must be determined in the individual case, depending on the particular properties of the components to be joined, and determined by means of test series and/or based on empirical values.

In many applications it is not necessary to provide holes beforehand in the components to be joined; instead, the unmelted core of the dome bores the required holes through the components to be joined. Alternatively, the components to be joined may be punched prior to joining.

The method according to the invention also has the advantage that a relatively large contact surface or welding surface results between the components to be connected and the dome. The size of this contact surface may be easily varied over a wide range, depending on the requirements in the individual case, via the diameter of the holes provided in the first method step.

If, for example, a metal sheet and a component made of a fiber-reinforced plastic are to be joined together using the method according to the invention, the dome is guided through a hole introduced beforehand in the metal sheet. The rotating or oscillating dome subsequently penetrates into the material of the fiber-reinforced plastic and bores a hole, so that after the friction welding connection according to the invention is established, the metal sheet is clamped, in a manner of speaking, between the head of the dome and the component made of fiber-reinforced plastic. For this material combination as well, it is possible to introduce a hole in the component made of fiber-reinforced plastic prior to the joining.

The method according to the invention may also be used to connect a dome to a component made of filled plastic, by friction welding. This dome may then be used as a fastening point for installing further components, for example using screws.

It is self-evident that multiple friction welding connections according to the invention for joining two or more components may be provided at a distance from one another if necessary. Similarly, for example sheet metal parts in aircraft construction may be joined together by one or more rows of rivets.

To establish a high-performance form-fit connection according to the invention, it is advantageous for the dome to be made at least partially of a thermoplastic plastic, preferably a filled plastic, preferably (glass) fiber-reinforced polyamide or polypropylene. Of course, this material listing is not exhaustive, and is by way of example only. It is self-evident that numerous plastics, in particular thermoplastic plastics, with or without fillers may be used for producing domes according to the invention.

The dome advantageously has a head, the head having an outer diameter that is larger than the shank of the dome. As a result, the dome is able to penetrate into the holes in the components to be connected only until the head of the dome comes to rest on the first of the two components. When the dome has reached this position, the movement of the dome may be continued until the contact surface between the head of the dome and the one component is heated by friction until at least a portion of the head softens and becomes flowable. If the movement of the dome is then interrupted and the head of the dome is pressed against the components to be connected, at the contact surface between the head and the component to be connected this also results in a large-surface friction welding connection and welding of the hole edge surfaces of the previously introduced holes or of the holes produced by the dome during the setting operation itself, which further increases the load-bearing capacity of the connection according to the invention.

This assumes that the component to be connected, which has contact with the head of the dome, is weldable to the material of the head.

In one advantageous embodiment of the method, at least one of the components to be joined is punched prior to the joining. So-called prepunching may be advantageous when a component to be joined is made of metal, for example, or has a hard cover layer, for example a hard thermosetting cover layer. For such a hard material, the dome itself cannot create the installation space during the setting motion or during the rotational, oscillating, and/or circular joining motion(s) by melting onto the components to be connected.

In one advantageous embodiment, the plastic dome according to the invention undergoes rotational, oscillating, and/or circular joining motions.

In order for the dome to be rotationally drivable and the torque necessary for melting to be transmittable, in one preferred embodiment the head of the dome is designed for accommodation in a drive device and/or for transmitting torques. This may take place, for example, using a conventional hexagon socket, an internal multitooth connection, or an appropriately designed outer contour of the head, for example as a polygon or a hexagon.

One important aspect in the design of the head is the torque transmission and the clamping of the dome in a drive unit of a friction welding device.

An embodiment of the dome without a head or with a countersunk head, i.e., without an edge projection, which in certain applications may be used as a recessed element, would also be conceivable.

In another advantageous embodiment of the dome according to the invention, the dome has a central axial borehole which may be designed either as a blind hole or as a through hole. By means of this axial borehole, it is easily possible to align the dome coaxially with respect to a rotation axis of the drive device and insert the dome into the optionally prepunched holes in the components to be connected. After the friction welding connection according to the invention is established, the axial borehole may also be used, for example, for screwing a (metal) screw, a bolt, and/or a hook into the thermoplastic plastic of the dome. This means that further components may be fastened to the head, or also to the end of the dome opposite from the head, in a customary manner by screwing and/or insertion.

When the axial borehole is designed as a through hole, conventional cylinder screws may be inserted through this axial borehole, and these screws may then be easily inserted, using appropriate nuts and preferably washers made of a nonmetallic material. In addition, it is possible to use the dome as a tube for insertion of a self-tapping screw or a suitable double bolt. The relatively large wall thickness of the dome reliably prevents contact between the metallic screw and the graphite in the carbon fibers or the other fillers of the components to be connected, so that no contact corrosion occurs.

In order for the friction welding connection according to the invention to be strong and capable of bearing a load, in one advantageous embodiment of the dome it is provided that the dome has a truncated conical shank, the diameter of the shank at the head being greater than the diameter at the end of the shank facing away from the head. In this case it is possible to insert the dome with its thinner end into the optionally prepunched holes in the components to be connected, and with rotation, to press it into the holes in the components to be connected until the head of the dome rests against the first component to be connected and is welded thereto at that location.

To ensure good centering or insertion of the dome into the optionally prepunched holes in the components to be connected, the diameter of the shank at an end facing away from the head is essentially equal to or slightly smaller than the diameter of the holes in the components to be connected.

It has also proven to be advantageous when the proportion of filler in the dome is 10 to 50 percent by weight, particularly preferably 30 percent by weight. In this case, the dome 5 has high mechanical strength, and at the same time is very well suited for friction welding.

The advantages which are achievable by the method according to the invention and the domes according to the invention result in an assembly unit as claimed, wherein this assembly unit comprises at least two components, of which at least one component is made of a fiber-reinforced plastic, wherein at least two components are joined by one or more domes made of a filled plastic, preferably glass fiber-reinforced polyamide or polypropylene, using the joining method according to the invention.

It is provided that at least the component that is situated facing away from the head of the dome is made of a fiber-reinforced plastic. It is then possible to join the components together in the above-described manner by means of the plastic dome according to the invention.

Ideally, the at least one of the components to be joined, made of fiber-reinforced plastic, has a matrix composed of a thermoplastic material, so that, due to the friction between the component and the dome, not only is the material of the dome partially converted into the flowable state, but also the matrix of the at least one component made of fiber-reinforced plastic is heated and converted into the flowable state. The strength of the connection between the dome and this component may thus be even further increased. In addition, by use of the dome made of a flowable material it is possible with this method to weld materials having a thermosetting or elastomeric matrix.

Suitable as fillers are all known inorganic fillers in various forms, for example in fibers such as glass fibers, basalt fibers, boron fibers, ceramic fibers, silicic acid fibers, metallic reinforcement fibers, and organic fillers in various forms, for example reinforcement fibers such as aramid fibers, carbon fibers, polyester fibers, Nylon fibers, polyethylene fibers, or Plexiglas fibers (polymethyl methacrylate fibers), for the components to be connected as well as for the domes.

Further advantages and advantageous embodiments of the invention are apparent from the following drawings, the descriptions thereof, and the patent claims. All features and properties mentioned in the drawings, the descriptions thereof, and the patent claims may be essential to the invention, individually as well as in any combination with one another.

Figure 2:
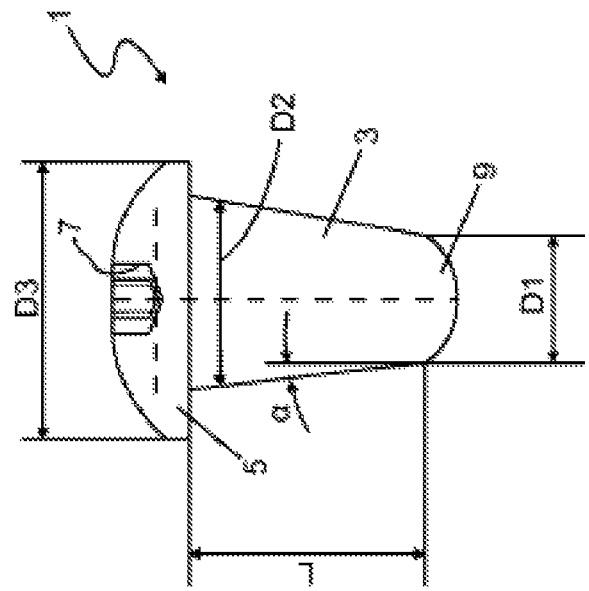
Figure 3:
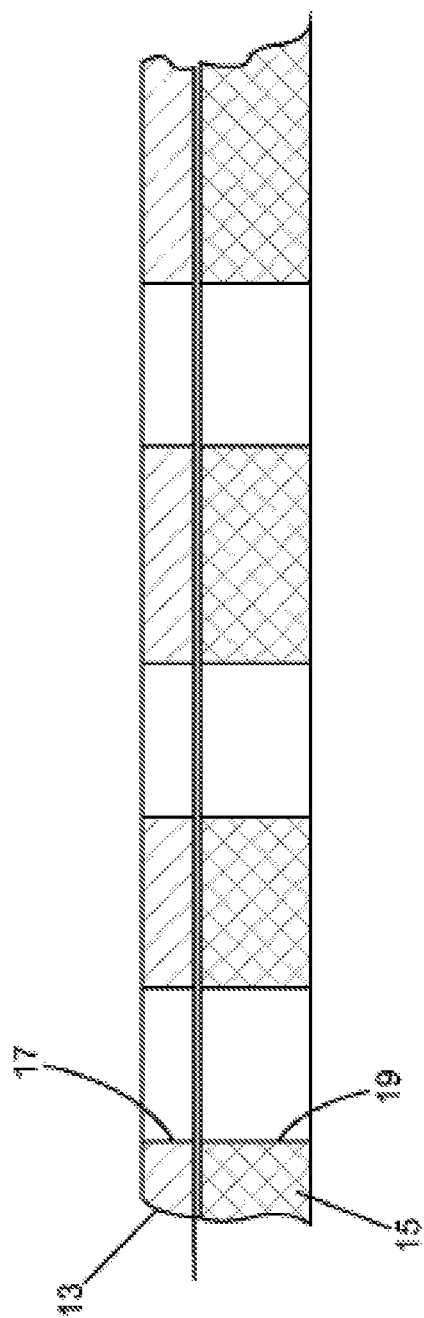
Figure 4:
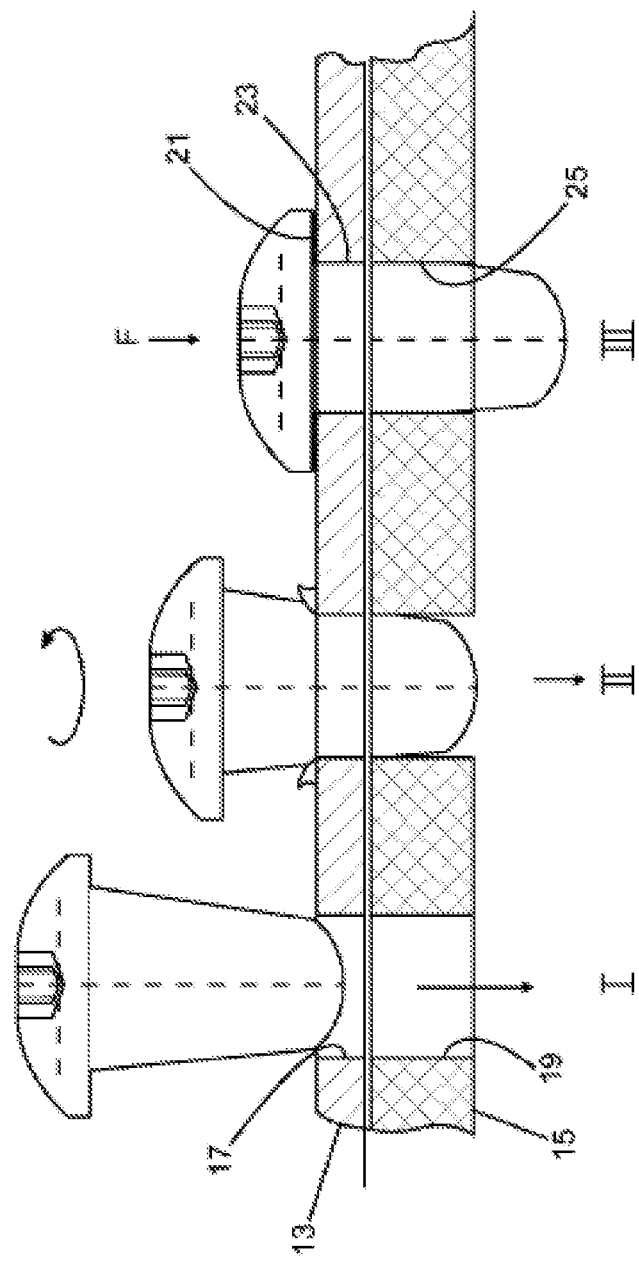
Figure 5:
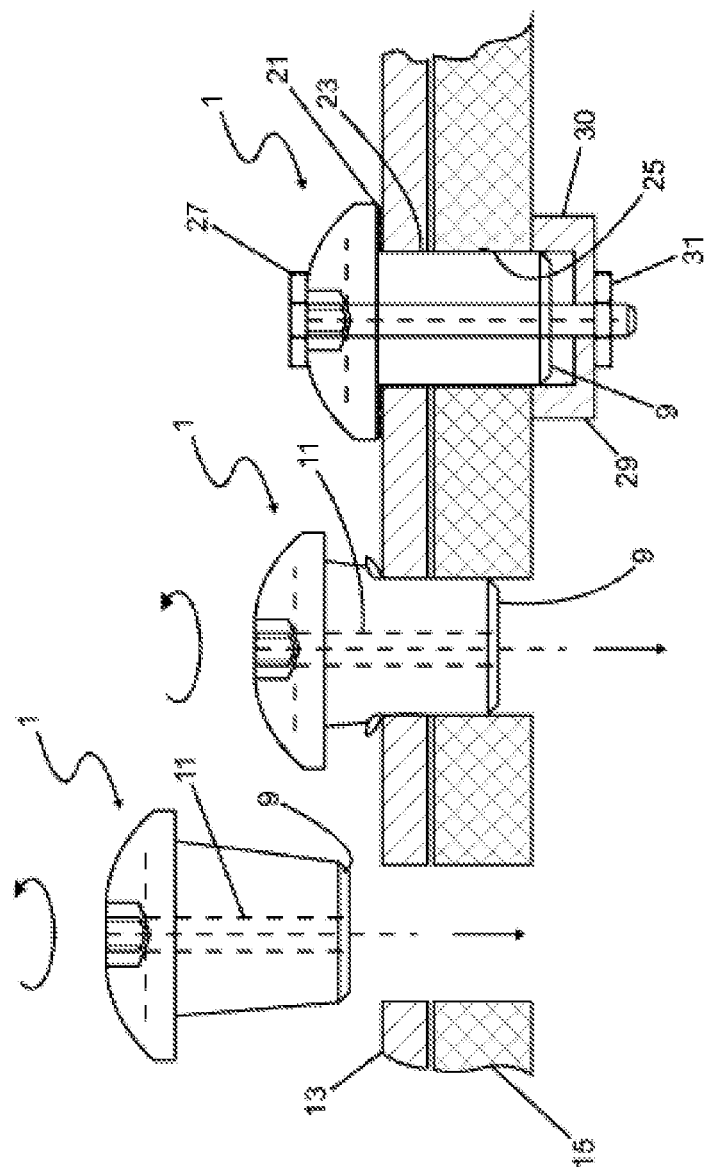
Figure 6:
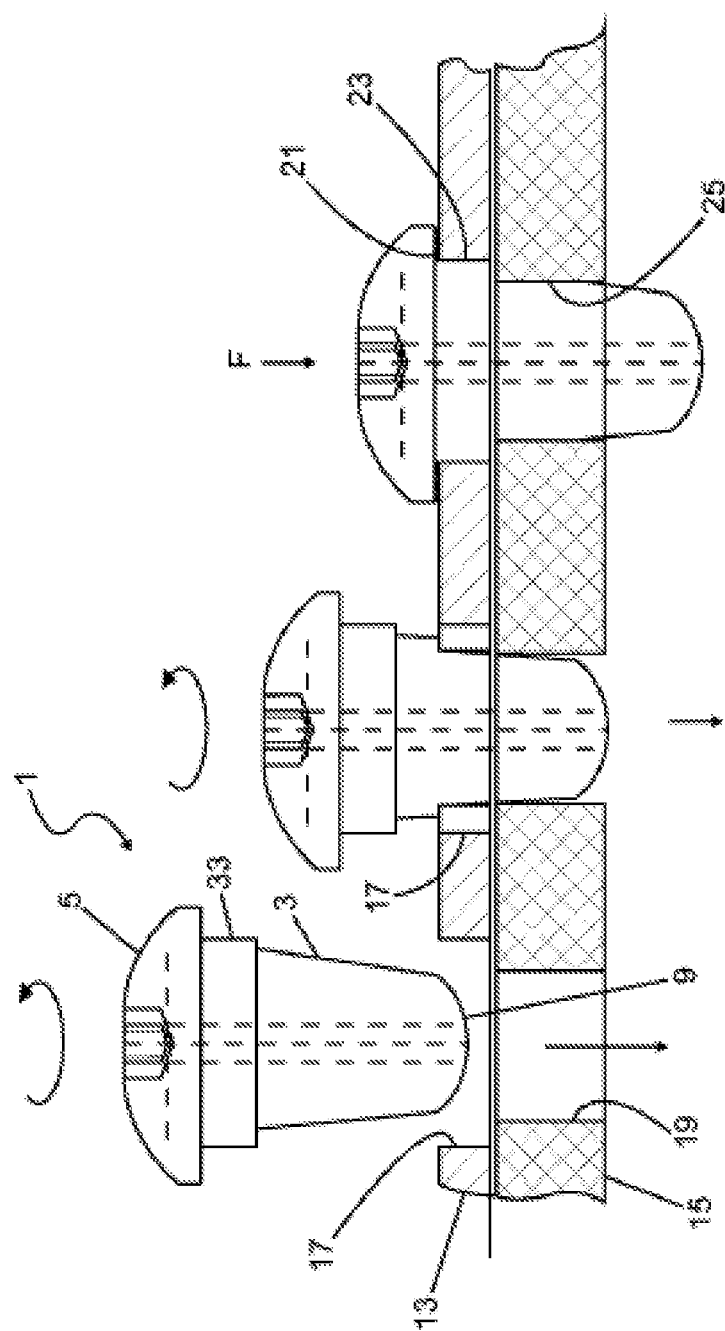
Figure 7:
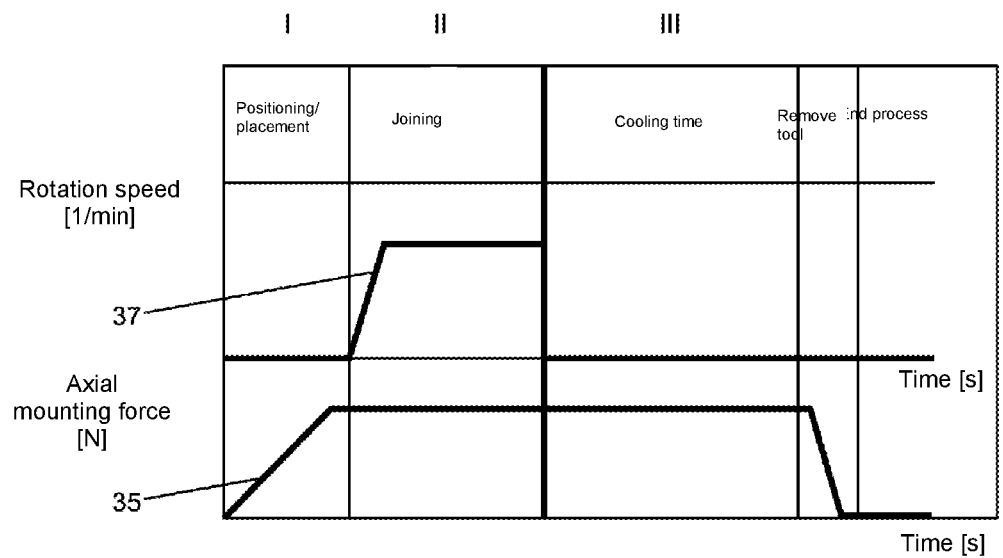

The drawings show the following:

FIGS. 1 and 2 show two exemplary embodiments of the domes according to the invention, FIG. 3 shows two components to be joined together, with holes already introduced, FIGS. 4 to 6 show various exemplary embodiments of the method according to the invention for joining the components illustrated in FIG. 3, in various stages, FIG. 7 shows the time sequence of the method for joining according to the invention, and FIGS. 8 and 9 show further exemplary embodiments of the joining method according to the invention.

FIG. 1 illustrates a dome which is denoted overall by reference numeral 1. The dome 1 includes a shank 3 having a truncated conical design, and a head 5. One end of the shank 3 facing away from the head 5 has a diameter $D_1$ that is smaller than a diameter $D_2$ of the shank 3 in the immediate proximity of the head 5. The diameter $D_3$ of the head 5 in turn is larger than the diameter $D_2$ of the shank 3.

Indicated in the illustration of the head 5 is a hexagon socket 7 which may be used to accommodate the dome 1 in a drive device of a friction welding machine (not illustrated). Of course, other types of torque transmission between a drive device and the dome 1 are possible. For example, the head 5 may be designed as an external hexagon or polygon, and the torque required for the friction welding may be transmitted to the dome 1 in this manner.

The shank 3 preferably has a conical design, since the design specifies to a certain extent how much material of the shank 3 is heated and melted on (weld filler material) during the joining according to the invention. This is the truncated conical portion of the shank 3, as is apparent from FIG. 4.

The design of the weld filler material may be appropriately set over a very wide range via the length L of the shank 3 and the cone angle α, depending on the requirements of the application.

On an end 9 of the shank 3 opposite from the head 5, the shank 3 has a concave shape or some other shape so that it is well centered in a predrilled hole 17, 19 in the components to be joined.

If there are no predrilled holes in the components to be joined, the end 9 of the shank 3 is preferably designed in such a way that the shank 3 "bores" or introduces the holes into the components.

FIG. 2 illustrates another exemplary embodiment of a dome 1 according to the invention. Identical components are provided with the same reference numerals, and the statements made concerning the other figures correspondingly apply.

The essential difference between the dome 1 according to FIG. 2 and the first exemplary embodiment according to FIG. 1 is that the dome 1 according to FIG. 2 has an axial borehole 11, which in the present case is designed as a through hole.

It is self-evident that the axial borehole 11 may also be designed as a blind hole (not illustrated), for example when gases or liquids are not supposed to flow through the dome 1. It is possible for the axial borehole 11 to be designed as a blind hole, beginning at the end 9 of the shank 3, or for the axial borehole to begin in the head 5 of the dome 1 and to end before reaching the end 9.

FIG. 3 illustrates by way of example a first component 13 and a second component 15 in cross section. The first component 13 may be a metal sheet, for example, made of a metallic material, while the second component 15 may be made of a fiber composite, for example containing carbon fibers and a thermoplastic matrix. For reasons of simplicity in the illustration, the two components 13 are illustrated as plate-shaped components having multiple mutually spaced holes 17 and 19 which may be introduced into the components 13, 15 in a prior optional method step.

Alternatively, it is possible for the components 13, 15, without holes, to be placed one on top of the other in the desired position (see FIG. 8).

It is also possible for only one of the components 13, 15 to be prepunched, and for the two components to be placed one on top of the other in the desired position prior to joining (see FIG. 9).

The joining operation according to the invention then begins by setting the dome in rotation and/or oscillation. At the same time, the dome penetrates into the components 13, 15, thus producing the required hole or holes.

The midpoints of the holes 17 and 19 in the two components 13 and 15 are congruent. In the illustrated exemplary embodiment, the diameters of the holes 17 and 19 are also equal, although this is not mandatory. It is also possible for the holes to have different diameters, and for the dome 3 to correspondingly have a stepped shank. This variant is illustrated in greater detail in FIG. 6.

In many applications, it is not sufficient to connect the two components 13 and 15 using only one dome 1; rather, multiple friction welding connections according to the invention are mounted at a distance from one another, similar to a row of rivets, in order to achieve sufficient strength.

FIG. 4 illustrates, only by way of example, the joining operation in three stages I, II, and III. Beginning on the left side in FIG. 4, the dome 1 is centered over the previously introduced holes 17 and 19 (I in FIG. 4) and subsequently set in rotation, and at the same time, pressed downwardly with rotation in FIG. 4, first through the hole 17 in the first component 13 and then through the hole 19 in the second component 15.

This intermediate stage of the joining operation (II in FIG. 4) is illustrated in the middle portion of FIG. 4. It is apparent that the truncated conical portion of the shank 3 is softened and partially removed, due to the rotary motion and the resulting friction between the shank and the holes 17 and 19, until it has a cylindrical shape whose diameter corresponds to the diameter of the holes 17 and 19. As soon as the head 5 of the dome 1 contacts the surface of the first component 13, friction also results at the ring-shaped contact surface between the head 5 and the component 13, and at least the bottom portion of the head 5 correspondingly melts and becomes flowable. The rotation of the dome is subsequently ended, and the so-called compression phase (III in FIG. 4) is initiated. This state is illustrated at the far right in FIG. 4. In this state, only a force F which acts in the axial direction on the head 5 of the dome 1 is exerted on the dome 1, so that the bottom side of the head 5 is optimally joined to the first component 13.

When the first component 13 is made of a fiber-reinforced plastic, ideally with a thermoplastic matrix, a circular first joining surface 21 results at that location, which due to its geometric dimensions is able to transmit relatively large forces. A cylindrical second joining surface 23 results between the hole 17 in the first component 13 and the shank 3 of the dome 1, and a further, third joining surface 25 which is likewise cylindrical results between the hole 19 in the second component 15 [and the shank 3].

It is apparent from the listing of the three joining surfaces 21, 23, and 25 and their sizes that a very intensive, load-bearing connection between the dome 1 and the first component 13 and between the dome 1 and the second component 15 may be achieved with the method according to the invention. Since the dome 1 together with its shank 3 has sufficient wall thickness and sufficient strength, high forces may be transmitted between the first component 13 and the second component 15 via the dome 1.

It is also conceivable to join the two components 13, 15 via the dome 1 without introducing the holes 17, 19 into the components beforehand. It is possible for the dome 1 itself to produce the required installation space, for example by melting onto the components 13, 15 in areas when it is rotationally or oscillatingly driven. This situation is schematically illustrated in FIG. 8. In the stage denoted by reference numeral II, it is apparent how the dome 1 has partially displaced the material of the components 13 and 15 in order to create space.

In the stage denoted by reference numeral III, a ridge (no reference numeral) which extends around the dome 1 and is joined to same is visible on the bottom side of the component 15. If the components 13 and 15 are not prepunched, these production steps are dispensed with, and the connection between the components 13 and 15 is particularly strong due to the fact that the unmelted core of the dome 1 establishes a form-fit connection, while the melted and subsequently resolidified areas form an integral bond connection.

FIG. 9 schematically illustrates the joining method according to the invention, using the example of a prepunched component 13 and a component 15 which is not prepunched. In the stage denoted by reference numeral II, it is apparent how the dome 1 has partially displaced the material of the components 13 and 15 in order to create space.

However, it may still be advantageous to punch the components 13, 15 prior to joining, and to introduce the holes 17, 19 prior to joining. The prior step of punching or introducing the holes 17, 19 may be necessary in particular for metallic components, or for components 13, 15 having a hard cover layer, such as a thermosetting cover layer.

A high-performance joint connection also results when the first component 13 is made of metal. In that case, however, the joining surfaces 21 and 23 are dispensed with, since the melted-on thermoplastic material of the dome 1 does not form an integral bond connection with a metal of the first component 13.

However, a force-fit connection then results between the head 5 and the second component 15, so that, similarly to a rivet or screw connection, a secure connection results between the components 13 and 15 with only an integral bonded joining surface 25.

If such a connection is to be exposed to particularly high stresses, it may be advantageous to provide a through axial borehole 11 in the dome 1, and to provide a screw together with a corresponding nut and a washer in this axial borehole 11. FIG. 5 schematically illustrates such an exemplary embodiment in a greatly simplified manner. In the right portion of FIG. 5, a screw 27 is inserted through the dome 1 according to the invention or the axial borehole 11 thereof, a washer 29 is placed thereon, and a nut 31 is screwed on. The washer 29 has a circumferential collar 30 which ensures that the washer 29 rests on the second component 15 and not on the end 9 of the dome 1. In this exemplary embodiment, a connection capable of bearing extreme load is securely and reliably possible, even with difficult material configurations/ material pairings, and no contact corrosion occurs at the screw 27 and nut 31.

FIG. 6 illustrates another exemplary embodiment of an assembly unit according to the invention and the method according to the invention, in which the holes 17 and 19 have different diameters. Accordingly, the dome 1 has a stepped design. The diameter of a shoulder 33 of the shank 3 is matched to the diameter of the hole 17 in the first component, while the other portion of the shank 3 is matched to the diameter of the hole 19 in the second component. It is thus possible, for example, to enlarge the joining surface 23. It is self-evident that this embodiment functions when the first component is made of a fiber-reinforced composite or a metallic material.

FIG. 7 schematically illustrates possible time sequences of the method according to the invention in diagram form. Time is plotted on the abscissa.

A first line 35 qualitatively represents the change over time of the axial force exerted on the dome 1.

A second line 37 qualitatively represents the change over time of the rotation speed of the dome 1.

The various method steps are indicated by the numbers I, II, and III corresponding to FIG. 4.

What is claimed is:

1. A method for joining at least two components, wherein at least one component is made of a fiber-reinforced plastic, comprising:
joining the at least two components to establish a form-fit connection by a dome made of a filled plastic having a head and a shank integral therewith;
setting the head of the dome in rotation, oscillation, and/or a circular motion, and the shank having a corresponding same motion via being integral with the head;
inserting the shank of the dome into the components to be connected by applying an axial force to the dome;
partially melting the dome by setting the dome in the rotation, oscillation, and/or circular motion and by applying the axial force to thereby produce friction against the components to be connected;
cooling melted material of the dome to at least one of the components to be connected such that a nonmetallic weld capable of bearing load is established between the dome and the respective at least one of the components; and
partially melting the shank, and cooling melted material of the shank at a radially outer periphery of the shank to provide a weld at the radially outer periphery of the shank with each of the at least two components,
wherein the inserting the shank of the dome further includes pressing the head of the dome in the axial direction against the components to be connected.

2. The method according to claim 1, wherein at least one of the components to be joined is punched prior to the joining.

3. The method according to claim 1, wherein the rotation, oscillation, and/or circular motion of the dome are/is ended and the dome is subsequently further pressed in the axial direction against the components to be connected.

4. The method according to claim 1, wherein a rotation speed, material of the dome, a material fill at the dome, a duration of the joining operation, and/or a duration of a subsequent pressing operation are/is selected as a function of the components to be connected.

5. The method according to claim 1, wherein the filled plastic is glass fiber-reinforced polyamide or polypropylene.

6. The method of claim 1, further including forming an installation space for the dome at at least one of the components to be connected, by the dome remaining at least partially non-fluid to thereby at least partially displace material of the at least one of the components to be connected.

7. The method of claim 1, wherein the head includes an upper surface disposed opposite a bottom surface from which the shank extends, and wherein the inserting the shank of the dome further includes pressing the bottom surface of the head of the dome against an outer surface of one of the components to be joined.

8. A method for joining at least two components, wherein at least one component is made of a fiber-reinforced plastic, comprising:
joining the at least two components to establish a form-fit connection by a dome made of a filled plastic having a head and a shank integral therewith;
setting the head of the dome in rotation, oscillation, and/or a circular motion, and the shank having a corresponding same motion via being integral with the head;
inserting the shank of the dome into the components to be connected by applying an axial force to the dome;
partially melting the dome by setting the dome in the rotation, oscillation, and/or circular motion and by applying the axial force to thereby produce friction against the components to be connected;
cooling melted material of the dome to at least one of the components to be connected such that a nonmetallic weld capable of bearing load is established between the dome and the respective at least one of the components; and
partially melting the shank, and cooling melted material of the shank at a radially outer periphery of the shank to provide an outer periphery weld at the radially outer periphery of the shank with each of the at least two components,
wherein the inserting the shank of the dome further includes pressing the head of the dome in the axial direction against the components to be connected, and
wherein the at least two components each are configured to be in welded engagement with the dome, and each are configured to be joined to substantially interface against one another along non-welded portions outward of the form-fit connection.

9. A method for joining at least two components, wherein at least one component is made of a fiber-reinforced plastic, comprising:
joining the at least two components to establish a form-fit connection by a dome made of a filled plastic having a head and a shank integral therewith, the shank extending from a bottom surface of the head;
setting the head of the dome in rotation, oscillation, and/or a circular motion, and the shank having a corresponding same motion via being integral with the head;
inserting the shank of the dome into the components to be connected by applying an axial force to the dome;
partially melting the dome by setting the dome in the rotation, oscillation, and/or circular motion and by applying the axial force to thereby produce friction against the components to be connected; and
cooling melted material of the dome to each of the at least two components to be connected such that a nonmetallic weld capable of bearing load is established between the dome and each of the at least two components,
wherein the inserting the shank of the dome further includes pressing the head of the dome in the axial direction against the at least two components to be connected and contiguously against an external periphery of the at least one of the at least two components or a second of the at least two components, and
wherein the shank in its final state within the at least two components is provided in greater surface area contact with the other of the at least two components against which the head of the dome is not contiguously pressed.

* * * * *